United States Patent [19]
Borrego et al.

[11] Patent Number: 5,486,840
[45] Date of Patent: Jan. 23, 1996

[54] HEAD UP DISPLAY WITH INCIDENT LIGHT FILTER

[75] Inventors: Diego A. Borrego, Lafayette; Alan R. Greenland, Westfield, both of Ind.; Charles R. Allison, Flint, Mich.; Robert A. Bordo, Harrison Township, Mich.; Steven A. Stringfellow, Oakland, Mich.

[73] Assignee: Delco Electronics Corporation, Kokomo, Ind.

[21] Appl. No.: 479,253

[22] Filed: Jun. 7, 1995

Related U.S. Application Data

[63] Continuation of Ser. No. 210,855, Mar. 21, 1994, abandoned.

[51] Int. Cl.$^6$ ....................................................... G09G 5/00
[52] U.S. Cl. .................... 345/7; 359/630; 359/13
[58] Field of Search ................. 345/7, 9; 359/493, 359/601, 614, 630, 631, 632, 633

[56] References Cited

U.S. PATENT DOCUMENTS

| | | | |
|---|---|---|---|
| 4,961,625 | 10/1990 | Wood et al. | 359/630 |
| 5,044,709 | 9/1991 | Smith et al. | 359/13 |
| 5,231,379 | 7/1993 | Wood et al. | 345/9 |
| 5,237,455 | 8/1993 | Bordo et al. | 359/632 |

Primary Examiner—Ulysses Weldon
Assistant Examiner—Matthew Luu
Attorney, Agent, or Firm—Jimmy L. Funke

[57] ABSTRACT

Glare and spurious reflections of external light on the image source of a head up display are eliminated by a circular polarizer in the optical path of the display. The head up display includes a mirror system for projecting a pattern from the image source onto a vehicle windshield where it is reflected to the operator, wherein polarization is effected at the windshield reflection. The circular polarizer includes a linear polarizer and a quarter wave plate arranged to extinguish the external incident light after reflection from the image source. The linear polarizer axis is aligned with the polarization axis at the windshield to optimize the brightness of the display.

3 Claims, 2 Drawing Sheets

HEAD UP DISPLAY WITH INCIDENT LIGHT FILTER

This is a continuation of application Ser. No. 08/210855 filed on 21 Mar. 1994, now abandoned.

FIELD OF THE INVENTION

This invention relates to head up displays for vehicles wherein a display image from an image source is reflected from a combiner such as the vehicle windshield, and particularly to such a display which suppresses adverse effects of external incident light.

BACKGROUND OF THE INVENTION

Head up displays (HUDs) for automotive vehicles comprise an image source for forming an illuminated pattern to be projected onto the windshield for reflection to the eyes of the vehicle operator. Then the display information is visible to the operator by looking straight ahead, and it is not necessary to look away from the road to read an instrument. A system of mirrors is used to direct the display image from the source to the windshield. The same system of mirrors can capture external light incident on the windshield and illuminate the source. The source typically comprises segments which are selectively illuminated to create the desired pattern, for example, a number. If, however, the non-selected segments are illuminated by incident light, they may appear to be part of the illuminated display. Incident light from bright sunlight as well as overhead street lights can produce such an undesirable effect.

It is known in the case of CRT displays or other conventional displays to use circular polarizers as glare filters. However, in the case of a HUD, polarization of the image already occurs at the windshield reflection and additional polarization of the image can result in reduction of image brightness, even to the point of completely extinguishing the image.

SUMMARY OF THE INVENTION

It is therefore an object of the invention to remove the effects of incident light in a head up display while maintaining a bright image.

The HUD system used to implement the invention employs an image source, a folding mirror and an aspheric mirror for projecting the image onto the windshield at an incident angle near Brewster's angle for reflecting the image to the operator, and a filter for suppressing the reflection of external light incident on the image source. While the invention is not restricted to HUDs having vacuum fluorescent (VF) image sources, it is useful there as well as for HUDs using certain liquid crystal and CRT sources. The VF source has several segments each of which can be brightly illuminated when energized, so that any numeral or other symbol can be constructed by selective energization. The mirror system projects the bright image onto the windshield. External light entering through the windshield and the mirror system could, but for the filter, reflect from the non-energized segments and appear to be part of the intended image. The filter prevents this unwanted reflection by selective circular polarization of the incident light and the source light.

The filter comprises a circular polarizer which is a linear polarizer laminated to a quarter-wave plate. The filter is positioned in the light path between the windshield and the image source, preferably near the image source, with the quarter-wave plate nearest the image source. Incident light first strikes the linear polarizer and then the quarter-wave plate which rotates the polarized light. The circularly polarized light reflects from the image source and phase shifts by 180°, then it is extinguished by the circular polarizer. On the other hand, the light which originates from an energized segment of the source is not initially polarized and thus is not affected by the quarter-wave plate, though it is linearly polarized by the linear polarizer. The light is then incident on the windshield at an angle near Brewster's angle, causing polarization at the reflection. To assure that the light intensity is not significantly diminished upon reflection at the windshield, the filter must be oriented with the linear polarization axis parallel to the polarization axis at the windshield.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a head up display using a vacuum fluorescent display and an arrangement for preventing reflection of ambient light from illuminating non-energized segments of the display tube. It should be recognized, however, that the principal of the invention applies also to the elimination of glare in head up displays using other image sources such as CRTs or LCDs. The image is projected onto a combiner which reflects the image to the operator while allowing the operator to see through the combiner. Here the combiner is the vehicle windshield, although a separate combiner element may be used. An optical system for projecting an image onto a combiner is described as a mirror arrangement, but a lens system might be used as well. The problem of incident light and the solution are the same for either type of combiner and for either type of projection optics.

Figure 1:
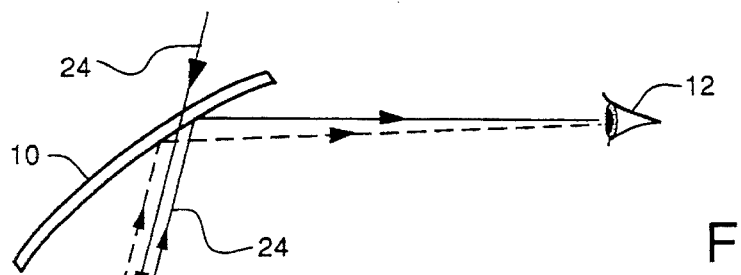
FIG. 1 is a schematic diagram of a head up display with light rays according to the prior art.

FIG. 1 shows a typical head up display which uses a vehicle windshield 10 as a reflecting surface for direction of display information to the eye 12 of a vehicle operator. A display image source 14 is located below the windshield 10 and hidden by the instrument panel for projecting a light pattern onto the windshield via a mirror system comprising an aspheric mirror 16 and a folding mirror 18. Since windshield curvature would distort the projected light pattern, the aspheric mirror is designed to compensate for the distortion as well as to focus the light to determine the image size and apparent image location relative to the windshield. The folding mirror is used for packaging convenience, allowing a more compact system, and has no essential optical effect on the display pattern.

Figure 2A:
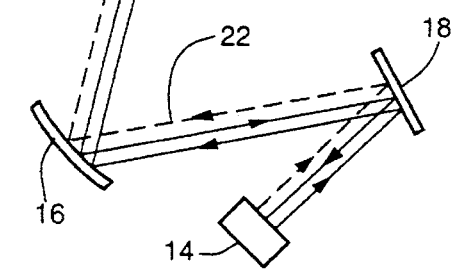
FIG. 2a and 2b are illustrations of a display with energized segments visible and all segments visible, respectively.
Figure 2B:

Preferably the image source 14 is a vacuum fluorescent display which comprises a plurality of segments which can be selectively energized or illuminated to create a desired display pattern. As revealed in FIG. 2a the segments 20 include bars which can comprise portions of numerals, and symbols for turn indicators and bright lights. The dark segments represent those which are energized so that the FIG. 2a displays "55 MPH". Referring again to FIG. 1, the light rays 22 shown by dashed lines represent the light emanating from the energized segments and which is reflected via the folding mirror 18, the aspheric mirror 16 and the windshield 10 to the observer. In such a system external light incident on the windshield 10 passes through the windshield and, as shown by the solid line rays 24, passes through the mirror system to the display and is reflected from the display segments to the observer. Where the incident light is bright sun light the light reflected from the non-energized segments is about as bright as that emanating from the energized segments so that all the segments are illuminated, as shown in FIG. 2b. At night, a similar effect is caused by overhead street lights, and where the vehicle is moving beneath street lights.

Figure 3:
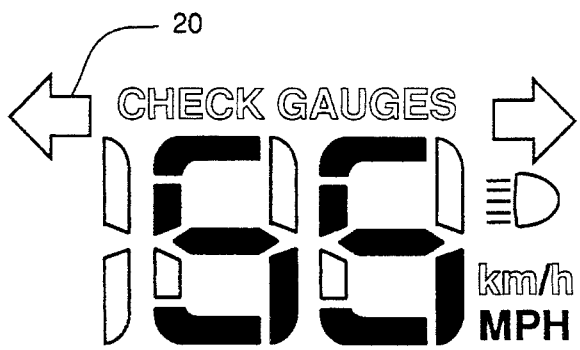
FIG. 3 is a schematic diagram of a head up display with light rays, according to the invention.
Figure 3:
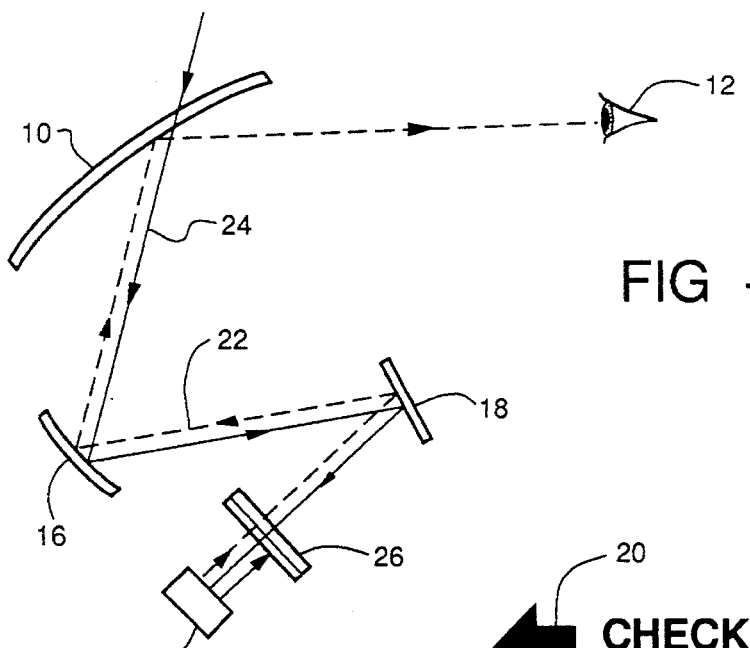

As shown in FIG. 3, the unwanted illumination of the image source 14 by incident light is prevented by a circular polarizer 26 between the mirror system and the image source such that the incident light 24 first enters one side of the polarizer 26 and the light emanating from the display enters the other side of the polarizer. The polarizing axis of the circular polarizer must be carefully oriented to achieve the extinction of incident light with only minimal effect on the brightness of the desired display light pattern.

Figure 4:
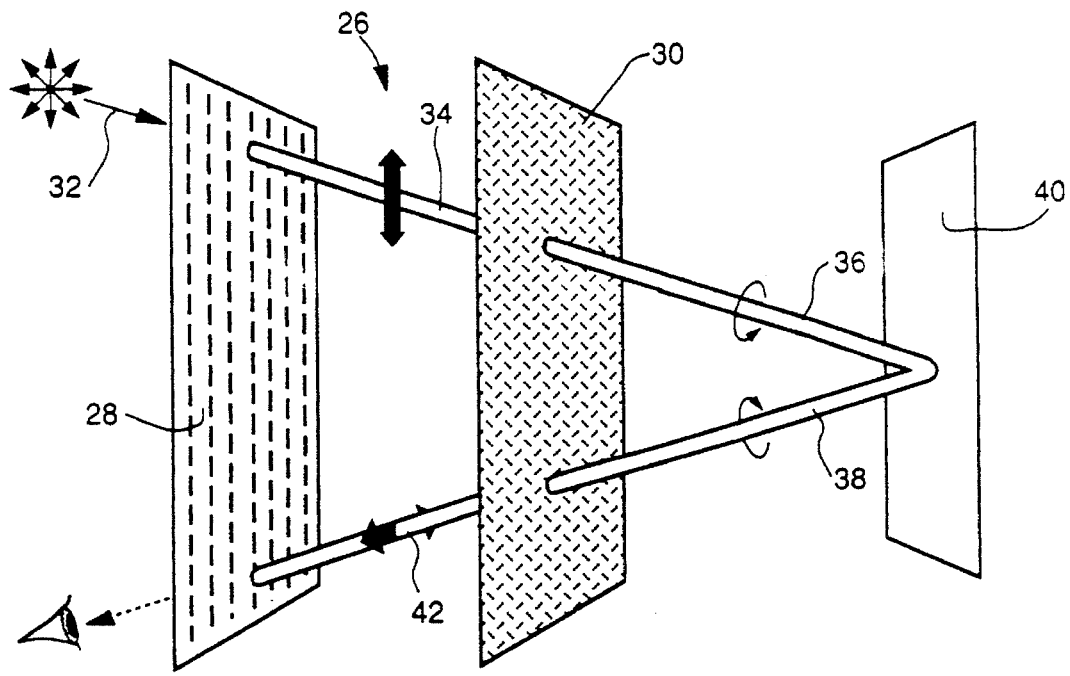
FIG. 4 is a diagram illustrating the operation of a circular polarizer for extinguishing reflected light.
Figure 5:
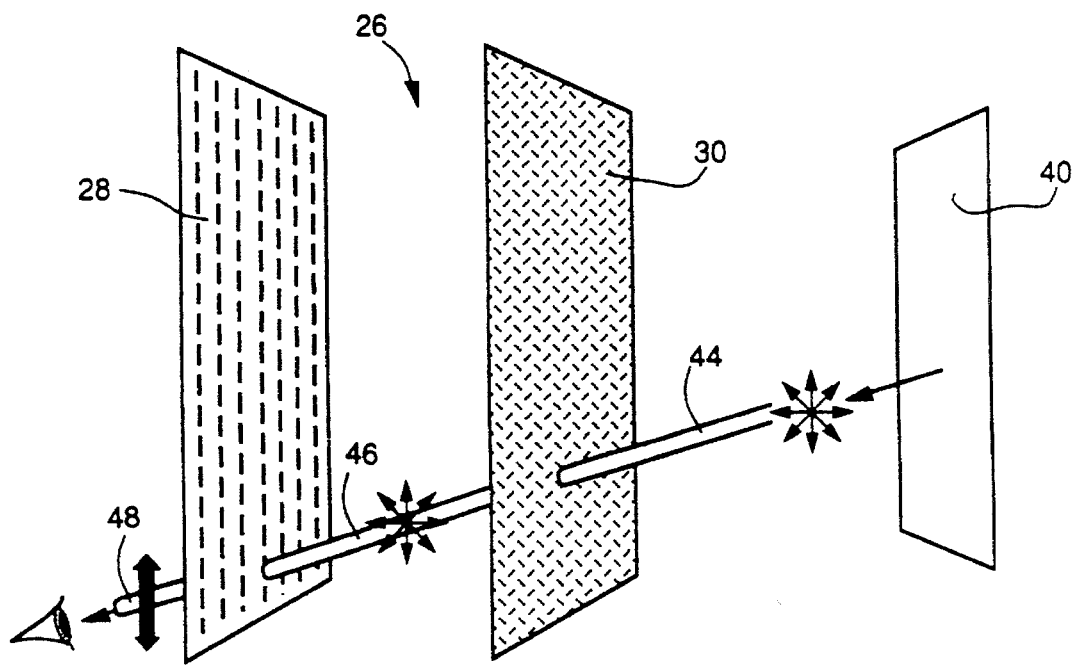
FIG. 5 is a diagram illustrating the operation of a circular polarizer in transmitting unpolarized light.

The effect of a circular polarizer on light is shown in FIGS. 4 and 5. As is well known, a circular polarizer comprises a linear polarizer 28 laminated to a quarter wave plate 30 having its fast axis at 45° to the polarization direction of the linear polarizer 28. For explanation purposes the two components are shown here as spaced. In FIG. 4, unpolarized incident light 32 passes through the linear polarizer 28 (displayed here as a vertical polarizer) which absorbs all the horizontally polarized components of the light. The light 34 exiting the polarizer 28 is therefore vertically polarized. The vertically polarized light 34 which enters the quarter-wave plate 30 emerges as circularly polarized light 36, shown here as right-hand circularly polarized. When light reflects off a surface at a near-normal angle of incidence it undergoes a 180° phase shift. Thus the light 38 is reflected from surface 40 as left-hand polarized. When it crosses the quarter-wave plate 30 it is converted to horizontally polarized light 42 which is then absorbed by the vertical polarizer 28. Thus no reflected light reaches the observer.

It is important to consider the effect of the circular polarizer 26 on the unpolarized light emanating from the display. In FIG. 5 the surface 40 represents the image source 14. The light 44 emitted from the display surface 40 passes through the quarter-wave plate 30 with substantially no effect so that the light 46 entering the vertical polarizer 28 is still unpolarized. The light 48 passing through the polarizer 28 is thus vertically polarized. Thus, for the light generated by the display, the net effect of the circular polarizer 26 is the same as that of a linear polarizer. The most important implication is that the brightness of the display source is cut in half, roughly, since the linear polarizer absorbs one of two orthogonal polarization components. While such a reduction of brightness is permissible for some applications such as glare reduction of a CRT, it is highly undesirable in a head up display.

It should be recognized that in a head up display a polarization of the display light takes place at the windshield reflection. When light reflects from a surface at Brewster's angle (56.7° for windshield glass) the light is fully polarized in one direction which is substantially horizontal for typical head up displays. Usually in such displays the angle of incidence of the display light is sufficiently near Brewster's angle to effect horizontal polarization of the light. For a range of angles around Brewster's angle, between about 50 and 65 degrees, the reflected light is very highly polarized, at least 10:1. In typical head up displays the windshield incidence angle is within that range. As a result the reflected light is substantially horizontally polarized, although the curvature of the windshield can produce some variance from a horizontal axis of polarization. Thus nearly all the vertical polarization component will be lost at the windshield.

By orienting the circular polarizer 26 with its polarization axis parallel to the polarization axis at the windshield, the polarized component will be efficiently reflected to the observer. In other words, for correct polarizer orientation, the component lost at the circular polarizer would have been lost anyway at the windshield reflection, and the display brightness is not substantially reduced by the circular polarizer. The net loss of the display brightness due to the circular polarizer should be less than 10%. The actual loss will depend on how close the head up display configuration comes to a true Brewster's angle at the windshield, and on possible reflection and transmission losses in the circular polarizer itself. The angular orientation of the circular polarizer is critical since substantial losses will be introduced if the polarizer is rotated a few degrees from its optimum position.

The circular polarizer 26 could be located at any point along the optical axis of the display as long as the desired display light enters from the side comprising the quarter-wave plate and the incident light enters from the other side. The position shown in FIG. 3 between the fold mirror 18 and the image source 14 is most practical because it minimizes the size of the circular polarizer 26. In general, it will most likely be best to locate the polarizer 26 as close as possible to the image source. It may even be possible to laminate or otherwise attach the circular polarizer to the face of the image source.

It will thus be seen that the invention eliminates potential washout of a head up display vacuum fluorescent tube or other image source without significantly reducing the display brightness. The unique configuration allows the glare-cutting benefit of a circular polarizer to be realized without the potential negative side-effect of reduced brightness.

The embodiments of the invention in which an exclusive property or privilege is claimed are defined as follows:

1. A head up display for reflecting information from a combiner wherein the angle of reflection effects light polarization, the display including optical filtering of extraneous reflections due to external incident light comprising:

a light emitting image source for generating display information, the image source comprising selectively energized segments subject to undesired illumination by external light incident on the combiner;

an optical system for projecting light from the image source onto the combiner at an incident angle near Brewster's angle to define a horizontal axis of polarization for light reflected from the combiner that originates from the image source; and a circular polarizer between the optical system and the image source for suppressing external incident light reflected from the display surface, the circular polarizer comprising a linear polarizer and quarter-wave plate in combination, the linear polarizer and quarter-wave plate being disposed to circularly polarized external incident light reaching the image source and to absorb such polarized light after reflection from the image source, and the linear polarizer having a polarization axis substantially parallel to the horizontal axis of polarization for horizontally polarizing light projected onto the combiner that originates from the image source to maximize the display efficiency.

2. The invention as defined in claim 1 wherein the image source comprises a vacuum fluorescent tube having segments subject to illumination by incident light when not energized.

3. The invention as defined in claim 1 wherein the light is projected onto the combiner at an incident angle in the range of 50 degrees to 65 degrees.

* * * * *